Dec. 18, 1956  F. C. BLIGHT  2,774,732
OPERATION OF CATION EXCHANGE UNITS
Filed June 14, 1951
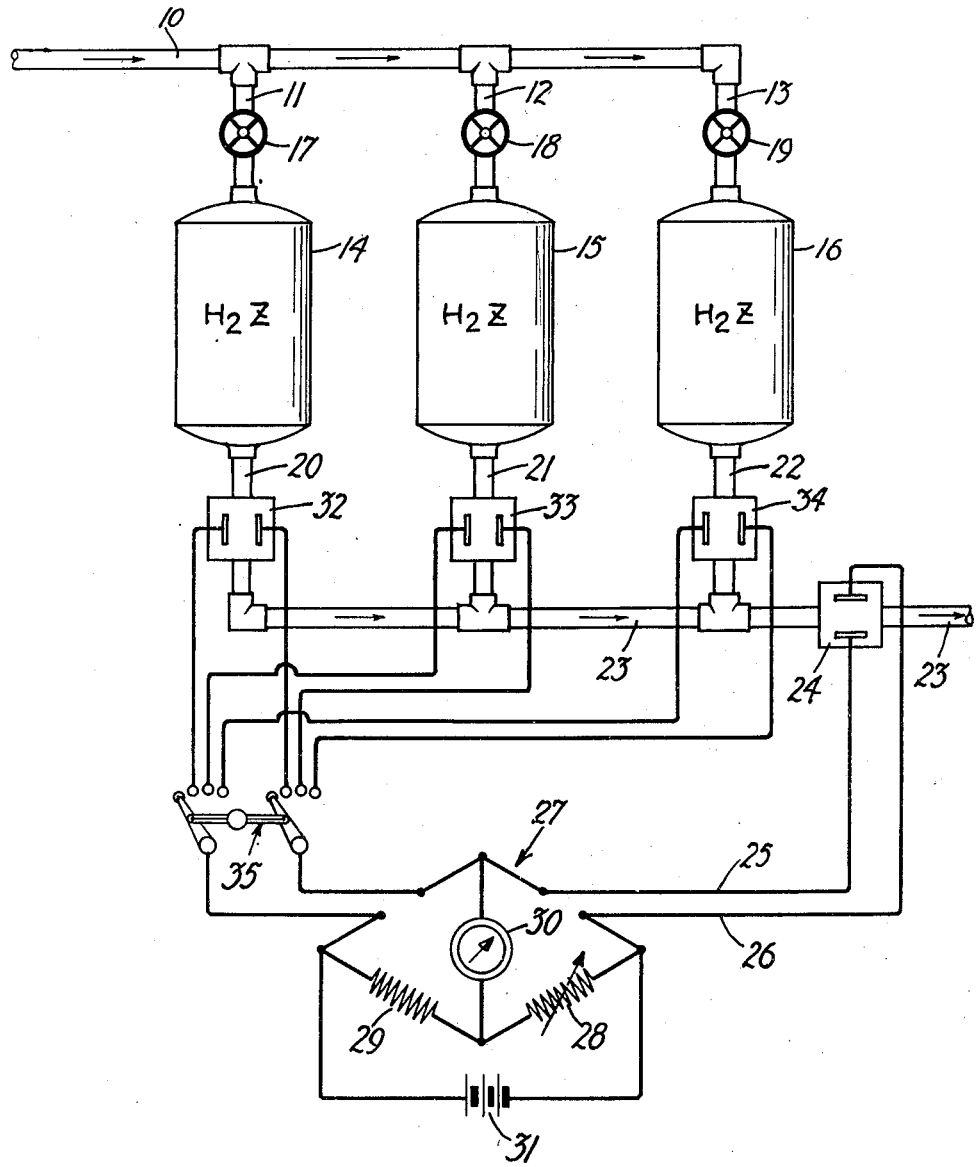
Inventor:
Frank Charles Blight
by  Clarence D. Kerr
Att'y United States Patent Office 2,774,732
Patented Dec. 18, 1956

2,774,732

OPERATION OF CATION EXCHANGE UNITS

Frank Charles Blight, Hanworth, England, assignor to The Permutit Company, New York, N. Y., a corporation of Delaware Application June 14, 1951, Serial No. 231,570

Claims priority, application Great Britain June 14, 1950

3 Claims. (Cl. 210—24)

This invention relates to removal of cations from a liquid in which the liquid is divided into separate streams and passed simultaneously through two or more hydrogen cation exchange units operated in parallel.

In the conditioning of many natural waters and in the treatment of other liquids, it is desirable to employ a cation exchange material operating in the so-called hydrogen cycle, i. e., in which the exchange material contains exchangeable hydrogen ions and gives up these hydrogen ions to the liquid in exchange for sodium, calcium, magnesium and other metallic cations contained in the liquid. In such a process, the exchange material in a given unit eventually becomes exhausted after a certain quantity of the liquid has been passed through it and loses enough of its exchange capacity so that it has to be regenerated. When necessary, the exchange material is regenerated with a dilute acid, such as hydrochloric or sulfuric acid.

For practical operation, and particularly in large installations, it is frequently desirable to divide the main stream of raw or untreated water or liquid into several streams and pass these streams simultaneously through two or more hydrogen exchange units. The effluents from the units are then combined for storage or immediate use. In such an installation, it is frequently desirable to stop the flow of liquid through one of the hydrogen exchange units at a time and regenerate this unit, while continuing the streams of liquid through the remaining units.

An object of this invention is to provide a method and apparatus for determining easily and accurately when any one of two or more hydrogen exchange units operating in parallel requires regeneration.

The invention will be described in connection with the accompanying drawing which shows diagrammatically a battery of three hydrogen exchange units operating in parallel, and provided with means for determining successively when each of the units needs regeneration.

While three such hydrogen exchange units are illustrated in order to explain the invention, it will be understood that the invention is equally applicable to any system where two or more such units are similarly employed.

The untreated or raw water is supplied through a pipe 10 and is divided into separate streams which flow through the branch pipes 11, 12 and 13, and thence through the hydrogen exchange units 14, 15 and 16, respectively. Valves 17, 18 and 19 may be provided in the branch pipes 11, 12 and 13 to control the flow of water through these individual units. The effluents from the three hydrogen exchange units are drawn off through the pipes 20, 21 and 22 to a larger main pipe 23 which carries the combined effluents to storage or service. Since these hydrogen exchange units are otherwise conventional they have been illustrated only diagrammatically and the usual provisions for backwashing, regenerating and rinsing have been omitted from the drawing.

Essentially, my invention provides for measuring and comparing the resistance or conductivity of the combined or blended effluent from these units with the resistance or conductivity of the effluent as it is withdrawn from any one of the individual exchange units. For this purpose, a conductivity cell 24 is arranged so that the combined or blended effluent flowing through pipe 23, or some of it, passes through this cell. This conductivity cell 24 is connected by wires 25 and 26 to a Wheatstone bridge device, indicated generally at 27, so that the resistance of the cell 24 forms one arm of the Wheatstone bridge 27. The Wheatstone bridge itself may be composed of a balancing variable resistance 28, a fixed resistance 29, a galvanometer or other suitable current measuring device 30 connected across the center of the bridge and a battery 31 or other suitable source of EMF applied to the ends of the bridge.

For purposes of comparison, a series of conductivity cells 32, 33 and 34 are located in the branch pipes 20, 21 and 22, respectively, so that the effluents from the individual exchange units, or a portion of these effluents, will pass through these cells before these effluents are mixed together or blended.

By means of the double-pole switch 35, any one of the cells 32, 33 or 34 may be connected electrically to the bridge 27 to form the fourth resistance or arm of the bridge 27.

In the operation of this apparatus, the three hydrogen exchange units when operating at full capacity, or shortly after regeneration, will each convert substantially all of the metallic cations in the raw water passed through the units into hydrogen ions. Under these conditions, the conductivity of the water passing through the cells 32, 33 and 34 will each be substantially the same as the conductivity of the combined effluent passing through the conductivity cell 24. However, as any one of the hydrogen exchange units becomes sufficiently exhausted to allow some of the metallic cations in the raw water to pass through it unchanged, the conductivity of the effluent from that unit will become substantially smaller than the conductivity of the more acid liquid flowing through the conductivity cell 24. Thus, by moving the switch 35 from one position to another to connect the cells 32, 33 and 34 successively to the Wheatstone bridge 27 and by observing the needle of the galvanometer 30, it is possible to note quickly any drop in operating exchange capacity of one of the exchange units 14, 15 or 16.

This apparatus is also useful in the same manner for determining the time at which the washing stage should be stopped after one of the units has been regenerated with acid. In this case the switch 35 is adjusted to connect the cell of the unit being washed to the Wheatstone bridge 27, and the wash water is allowed to pass through that cell. So long as excess acid is being washed out of the exchange unit, the acidity of this effluent passing through this individual cell will be as high or higher than that of the liquid passing through the conductivity cell 24. By observing the needle of the galvanometer 30, therefore, it is readily possible to determine when the excess acid has been washed out and the washing stage can then be stopped and the operating stage begun by again passing raw water through this regenerated unit.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of determining when any one of at least two hydrogen cation exchange units operating in parallel requires regeneration which comprises, comparing the conductivity of the combined effluents from said units, with the conductivity of the effluent from said one unit, and regenerating said one unit when the conductivity of its effluent becomes substantially lower than the conductivity of the combined effluents.

2. A process of determining when any one of at least two hydrogen cation exchange units operating in parallel requires regeneration which comprises, passing at least some of the combined effluents from said units through a conductivity cell, passing at least some of the effluent from said one unit through a separate conductivity cell, comparing the conductivities in said cells, and regenerating said one unit when the conductivity of its effluent becomes substantially lower than the conductivity of said combined effluents.

3. A method of determining when any one of several hydrogen cation exchange units being operated in parallel to condition liquid from the same supply requires regeneration which comprises, comparing the conductivity of the combined effluents from said units successively with the conductivity of the effluent from each of said units individually, and regenerating an individual unit when the conductivity of its effluent becomes substantially lower than the conductivity of the combined effluents.

References Cited in the file of this patent

UNITED STATES PATENTS

| | | |
|---|---|---|
| 1,145,509 | Pike et al. | July 6, 1915 |
| 1,388,613 | Simsohn | Aug. 23, 1921 |
| 1,708,958 | Schmidt | Apr. 16, 1929 |
| 2,003,760 | Sweeney et al. | June 4, 1935 |
| 2,315,223 | Riche | Mar. 30, 1943 |
| 2,404,367 | Durant et al. | July 23, 1946 |
| 2,617,766 | Emmett et al. | Nov. 11, 1952 |
| 2,628,194 | Gilwood | Feb. 10, 1953 |
| 2,711,995 | Sard | June 28, 1955 |

FOREIGN PATENTS

| | | |
|---|---|---|
| 569,660 | Great Britain | June 4, 1945 |